United States Patent
Tsai et al.

(10) Patent No.: US 10,442,346 B2
(45) Date of Patent: Oct. 15, 2019

(54) LAMP DEVICE

(71) Applicant: Young Optics Inc., Hsinchu Science Park (TW)

(72) Inventors: Wei-Hung Tsai, Hsinchu Science Park (TW); Ya-Ling Hsu, Hsinchu Science Park (TW); Hung-Chi Su, Hsinchu Science Park (TW)

(73) Assignee: Young Optics Inc., Hsinchu Science Park (TW)

( * ) Notice: Subject to any disclaimer, the term of this patent is extended or adjusted under 35 U.S.C. 154(b) by 0 days.

(21) Appl. No.: 15/824,587

(22) Filed: Nov. 28, 2017

(65) Prior Publication Data

US 2019/0039509 A1 Feb. 7, 2019

(30) Foreign Application Priority Data

Aug. 2, 2017 (TW) .............................. 106126011 A

(51) Int. Cl.
*B60Q 1/32* (2006.01)
*B60Q 1/24* (2006.01)
*F21S 43/14* (2018.01)
*F21S 43/20* (2018.01)

(52) U.S. Cl.
CPC ................. *B60Q 1/32* (2013.01); *B60Q 1/24* (2013.01); *B60Q 1/323* (2013.01); *F21S 43/14* (2018.01); *F21S 43/26* (2018.01); *B60Q 2400/40* (2013.01); *B60Q 2400/50* (2013.01)

(58) Field of Classification Search
USPC .................................................. 326/501, 509
See application file for complete search history.

(56) References Cited

U.S. PATENT DOCUMENTS

| | | | | |
|---|---|---|---|---|
| 7,175,323 B2 * | 2/2007 | Bucher | .................... | F21V 9/04 |
| | | | | 362/539 |
| 8,702,285 B2 * | 4/2014 | Harada | ................. | H01L 33/508 |
| | | | | 362/509 |
| 8,960,977 B2 * | 2/2015 | Yang | ...................... | F21V 13/12 |
| | | | | 362/488 |
| 9,487,126 B2 | 11/2016 | Salter et al. | | |
| 2009/0034230 A1 * | 2/2009 | Lim | ..................... | G02B 6/0028 |
| | | | | 362/84 |
| 2016/0193959 A1 | 7/2016 | Ammar et al. | | |

FOREIGN PATENT DOCUMENTS

| | | | |
|---|---|---|---|
| CN | 203517572 U | 4/2014 |
| CN | 204332297 U | 5/2015 |
| CN | 206145554 U | 5/2017 |

\* cited by examiner

*Primary Examiner* — Michael G Lee
*Assistant Examiner* — David Tardif
(74) *Attorney, Agent, or Firm* — Muncy, Geissler, Olds & Lowe, P.C.

(57) ABSTRACT

A lamp device includes a light source, a slide and a projection lens assembly. The light source generates an illumination beam, and the slide is disposed in a light path of the illumination beam. The slide has a profile image layer and a gradient layer, and the profile image layer and the gradient layer are disposed on two opposite sides of the slide. The profile image layer converts the illumination beam into profile image light without gradients, and the gradient layer converts the illumination beam into gradient light. The projection lens assembly receives and projects the gradient light and the profile image light.

20 Claims, 4 Drawing Sheets

142

142

143

LAMP DEVICE

BACKGROUND OF THE INVENTION a. Field of the Invention

The invention relates generally to a lamp device. More particularly, the invention is directed to a lamp device capable of projecting image patterns with gradients.

b. Description of the Related Art

In order to provide an image pattern generated by a puddle lamp with gradients, a conventional method is to perform halftone processing on the pattern through the use of dots, varying either in size or in spacing, to cause variations on brightness. However, large dots are liable to form undesired apparent images, and small dots are liable to cause Moiré patterns due to their regular arrangement. Therefore, gradient effects and visual effects may be lowered. Besides, although the use of small dots may prevent the formation of apparent dot images, a great number of small dots with high DPI are needed to provide low grayscale (low brightness) effects to result in a bulky figure file, time-consuming image processing and higher costs. Further, in the conventional design, a halftone pattern and a profile pattern are formed on the same layer, and thus it may cause a serrated edge of a projected image pattern to thus worsen visual effects, with the serrated edge being formed by dots images besides a pattern profile. Moreover, in case a profile pattern and a gradient pattern are formed on the same layer by the lithography printing, a line width that can be printed out is restricted to be larger than a minimum value to result in thicker profile lines (≥2 mm) and thus fails to further improve image resolution.

BRIEF SUMMARY OF THE INVENTION

According to one aspect of the present disclosure, a lamp device includes a light source, a slide and a projection lens assembly. The light source generates an illumination beam, and the slide is disposed in a light path of the illumination beam. The slide has a profile image layer and a gradient layer, and the profile image layer and the gradient layer are disposed on two opposite sides of the slide. The profile image layer converts the illumination beam into profile image light without gradients, and the gradient layer converts the illumination beam into gradient light. The projection lens assembly receives and projects the gradient light and the profile image light.

According to another aspect of the present disclosure, a lamp device includes a light source, a first slide, a second slide and a projection lens assembly. The light source generates an illumination beam. The first slide is disposed in a light path of the illumination beam and has a profile image layer, and the profile image layer converts the illumination beam into profile image light without gradients. The second slide is disposed in a light path of the illumination beam and has a gradient layer, and the gradient layer converts the illumination beam into gradient light. The projection lens assembly receives and projects the gradient light and the profile image light.

According to another aspect of the present disclosure, a lamp device disposed near a vehicle door includes at least one light valve and a projection lens assembly. The light valve has a profile image layer and a gradient layer, and the profile image layer and the gradient layer are separate from each other. The projection lens assembly gathers light beams passing through the profile image layer and the gradient layer to form a composite image, and the projection lens assembly projects the composite image outside the vehicle door. The profile image layer is disposed on a focusing position of the projection lens assembly, and the gradient layer is disposed on an out-of-focus area of the projection lens assembly.

According to the above embodiments, since the profile image layer and the gradient layer may be spaced apart from each other, the profile image layer can be disposed on a focusing position of the projection lens assembly to form a clear profile image, and the gradient layer can be disposed on an out-of-focus area outside the focusing position to form blurred gradients. For example, in case the gradient layer is a halftone pattern with multiple dots varied in size and spacing, a blurred halftone pattern needs not to be formed in high pixel resolution to thus reduce fabrication time and costs. Besides, a blurred halftone may avoid Moiré pattern formed as a result of interfere of dot images. Accordingly, gradient effects and visual effects are sharpened. Further, since the gradient layer may be disposed separate from the profile image layer to blur the halftone pattern, a serrated edge formed as a result of dot images besides the profile can be eliminated. Besides, in case the gradient is formed by lithography printing, the minimum line width requirement for a printed pattern is no longer needed because the gradient layer is disposed separate from the profile image layer. Therefore, a pattern profile can be formed by thinner lines to further improve image resolution.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
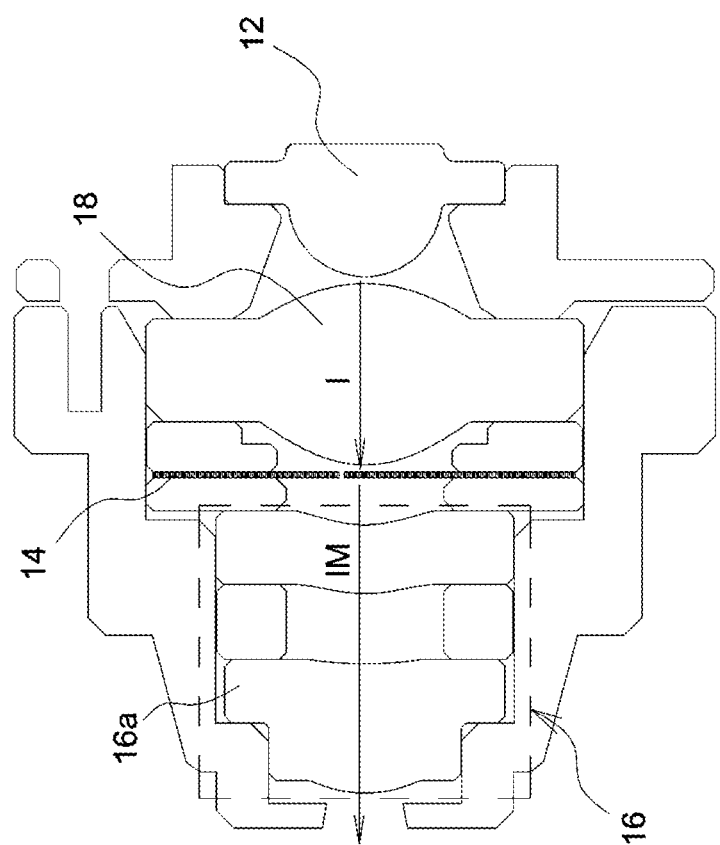
FIG. 1 shows a schematic diagram of a lamp device according to an embodiment of the invention.

FIG. 1 shows a schematic diagram of a lamp device according to an embodiment of the invention. As shown in FIG. 1, a lamp device 10 includes a light source 12, a slide 14 and a projection lens assembly 16. The light source 12 is capable of generating an illumination beam I, and the slide 14 is disposed in a light path of the illumination beam I. The illumination beam I passes the slide 14 to form an image beam IM that corresponds to a predefined image pattern to be projected. The projection lens assembly 16 receives and then projects the image beam IM to form a predetermined lighted image. The term "slide" as used herein refers to a film medium carrying and representing optical information by characteristic behaviors of light waves (e.g., reflection, refraction, diffraction, interference, etc.) Therefore, the slide 14 may include, but is not limited to, a film, an optical filter or a laser-based hologram. The lamp device 10 may further include a condenser lens 18 disposed between the light source 12 and the projection lens assembly 16 to condense the illumination beam I of the light source 12. Further, the projection lens assembly 16 may include at least one projection lens 16a (such as multiple projection lenses 16a shown in FIG. 1) to gather light beams passing through the slide 14. The lamp device 10 may be used in various ways. For example, the lamp device 10 may be disposed near a door of a vehicle and projects a lighted image on the ground near the vehicle door to serve as a puddle lamp.

Figure 2:
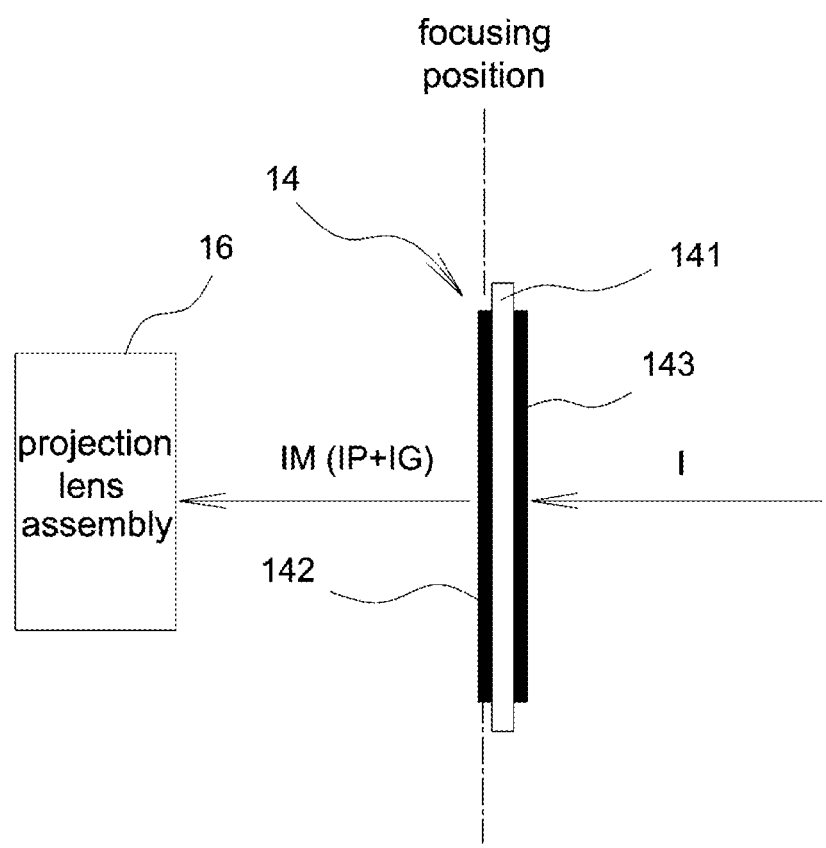
FIG. 2 shows a schematic diagram of a slide according to an embodiment of the invention.
Figure 3A:
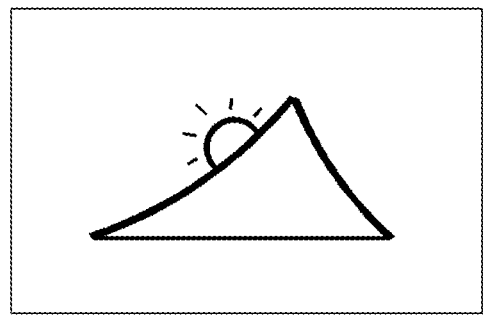
FIG. 3A shows a schematic diagram of a profile image layer according to an embodiment of the invention.
Figure 3B:
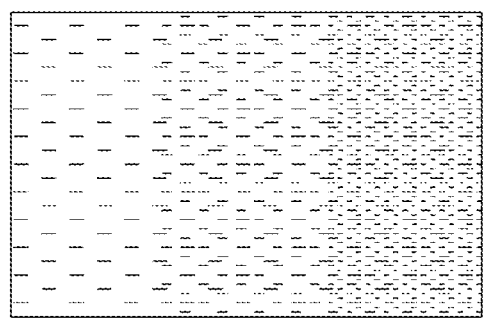
FIG. 3B shows a schematic diagram of a gradient layer according to an embodiment of the invention.

FIG. 2 shows a schematic diagram of a slide according to an embodiment of the invention. As shown in FIG. 2, the slide 14 may include a substrate 141, a profile image layer 142 (shown in FIG. 3A), and a gradient layer 143 (shown in FIG. 3B). The profile image layer 142 and the gradient layer 143 are disposed on two opposite sides of the substrate 141. The gradient layer 143 may be formed by various ways, such as halftone printing or lithography printing. The halftone printing uses dots, varying either in size or in spacing, to generate gradient-like effects. The lithography printing uses photographic and development processes to form pattern profiles and gradients. The profile image layer 142 can be black-and-white or multi-colored. Light beams passing through the profile image layer 142 forms a profile of a predetermined lighted image, and light beams passing through the gradient layer 143 forms gradients that cause variations only on brightness. That is, the profile image layer 142 converts the illumination beam I into profile image light IP without gradients, and the gradient layer 143 converts the illumination beam I into gradient light IG. Therefore, the slide 14 may function as a light valve to allow the projection lens assembly 16 to project a composite image having both profile patterns and gradients, after the projection lens assembly receives the profile image light IP and the gradient light IG. In this embodiment, the profile image layer 142 does not touch and is spaced apart the gradient layer 143 by an interval, and the interval may be larger than 0.1 mm. As shown in FIG. 2, in this embodiment, since the profile image layer 142 and the gradient layer 143 are spaced apart from each other, the profile image layer 142 can be disposed on a focusing position of the projection lens assembly 16 to form a clear profile image, and the gradient layer 143 can be disposed on an out-of-focus area outside the focusing position to form blurred gradients. For example, in case the gradient layer 143 is a halftone pattern with multiple dots varied in size and spacing, a blurred halftone pattern needs not to be formed in high pixel resolution to thus reduce fabrication time and costs. Besides, a blurred halftone may avoid Moiré pattern formed as a result of interfere of dot images. Accordingly, gradient effects and visual effects are sharpened.

Further, since the gradient layer 143 may be disposed separate from the profile image layer 142 to blur the halftone pattern, a serrated edge formed as a result of dot images besides the image profile can be eliminated. Besides, in case the gradient is formed by lithography printing, the minimum line width requirement for a printed pattern is no longer needed because the gradient layer 143 is disposed separate from the profile image layer 142. Therefore, the pattern profile can be formed by thinner lines to further improve image resolution.

Figure 4:
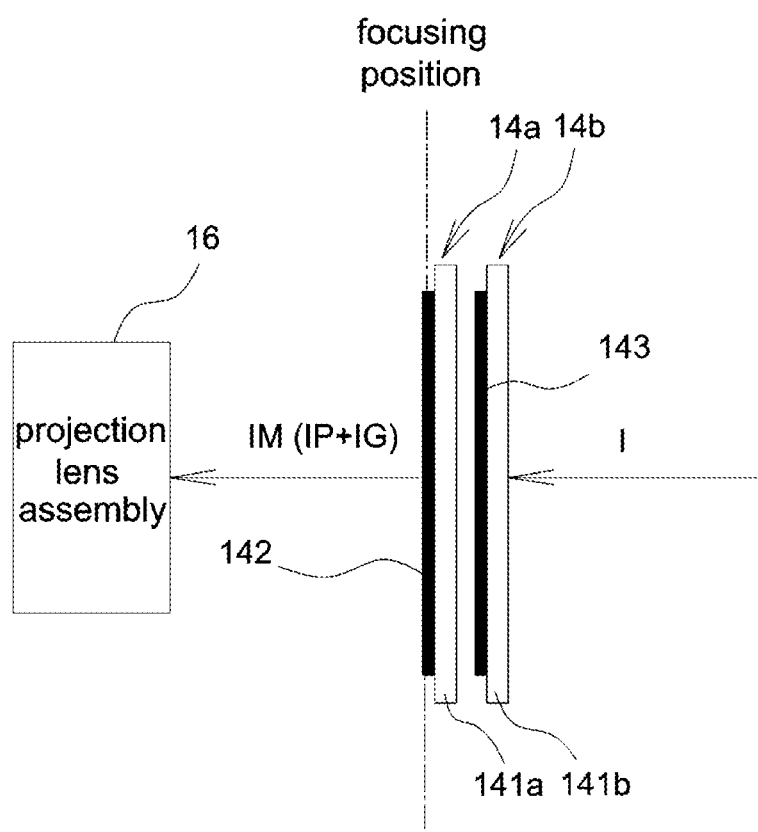
FIG. 4 shows a schematic diagram of a slide according to another embodiment of the invention.

FIG. 4 shows a schematic diagram of a slide according to another embodiment of the invention. As shown in FIG. 4, the lamp device 10 may have a first slide 14a and a second slide 14b. The first slide 14a has a profile image layer 142 formed on a substrate 141a, and the second slide 14b has a gradient layer 143 formed on a substrate 141b. The profile image layer 142 converts the illumination beam I into profile image light IP without gradients, and the gradient layer 143 converts the illumination beam I into gradient light IG. Therefore, according to different embodiments of the invention, the profile image layer 142 and the gradient layer 143 may be arranged in various ways. For example, the profile image layer 142 and the gradient layer 143 may be formed on the same slide (FIG. 2) or on different slides (FIG. 4). Further, in the above embodiment, the profile image layer 142 is disposed between the gradient layer 143 and the projection lens assembly 16, but the invention is not limited thereto. In another embodiment, the gradient layer 143 may be disposed between the profile image layer 142 and the projection lens assembly 16. Further, the gradient layer 143 is not limited to a specific color type. For example, the gradient layer 143 may be a gray-level layer, a binary monochrome layer or a multi-colored layer, but the invention is not limited thereto.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A lamp device, comprising:
   a light source for generating an illumination beam;
   a slide disposed in a light path of the illumination beam and having a profile image layer and a gradient layer, the profile image layer and the gradient layer being disposed on two opposite sides of the slide, the profile image layer defining a contour of a lighted image to be projected on an object and converting the illumination beam into profile image light that forms the contour of the lighted image without gradients, and the gradient layer converting the illumination beam into gradient light; and
   a projection lens assembly for receiving and projecting the gradient light and the profile image light.

2. The lamp device as claimed in claim 1, wherein the profile image layer is disposed on a focusing position of the projection lens assembly, and the gradient layer is disposed on an out-of-focus area outside the focusing position.

3. The lamp device as claimed in claim 1, wherein the slide is an optical filter or a laser-based hologram.

4. The lamp device as claimed in claim 1, wherein the profile image layer is spaced apart the gradient layer by an interval, and the interval is larger than 0.1 mm.

5. The lamp device as claimed in claim 1, further comprising a condenser lens disposed between the light source and the projection lens assembly.

6. The lamp device as claimed in claim 1, wherein the profile image layer is located between the gradient layer and the projection lens assembly, or the gradient layer is located between the profile image layer and the projection lens assembly.

7. The lamp device as claimed in claim 1, wherein the gradient layer is a gray-level layer, a binary monochrome layer, or a multi-colored layer.

8. A lamp device, comprising:
   a light source for generating an illumination beam;
   a first slide disposed in a light path of the illumination beam and having a profile image layer, and the profile image layer defining a contour of a lighted image to be projected on an object and converting the illumination beam into profile image light that forms the contour of the lighted image without gradients;
   a second slide disposed in a light path of the illumination beam and having a gradient layer, and the gradient layer converting the illumination beam into gradient light; and
   a projection lens assembly for receiving and projecting the gradient light and the profile image light.

9. The lamp device as claimed in claim 8, wherein the profile image layer is disposed on a focusing position of the projection lens assembly, and the gradient layer is disposed on an out-of-focus area outside the focusing position.

10. The lamp device as claimed in claim 8, wherein the slide is an optical filter or a laser-based hologram.

11. The lamp device as claimed in claim 8, wherein the profile image layer is spaced apart the gradient layer by an interval, and the interval is larger than 0.1 mm.

12. The lamp device as claimed in claim 8, further comprising a condenser lens disposed between the light source and the projection lens assembly.

13. The lamp device as claimed in claim 8, wherein the profile image layer is located between the gradient layer and the projection lens assembly, or the gradient layer is located between the profile image layer and the projection lens assembly.

14. The lamp device as claimed in claim 8, wherein the gradient layer is a gray-level layer, a binary monochrome layer, or a multi-colored layer.

15. A lamp device disposed near a vehicle door, comprising:
    at least one light valve, the light valve having a profile image layer and a gradient layer, the profile image layer defining a contour of a lighted image to be projected on an object and converting an illumination beam into profile image light that forms the contour of the lighted image, and the profile image layer and the gradient layer being separate from each other; and
    a projection lens assembly for gathering light beams passing through the profile image layer and the gradient layer to form a composite image and projecting the composite image outside the vehicle door, wherein the profile image layer is disposed on a focusing position of the projection lens assembly, and the gradient layer is disposed on an out-of-focus area of the projection lens assembly.

16. The lamp device as claimed in claim 15, wherein the profile image layer converts the illumination beam into the profile image light without gradients, and the gradient layer converts the illumination beam into gradient light.

17. The lamp device as claimed in claim 15, wherein the profile image layer is spaced apart the gradient layer by an interval, and the interval is larger than 0.1 mm.

18. The lamp device as claimed in claim 15, wherein the profile image layer is located between the gradient layer and the projection lens assembly, or the gradient layer is located between the profile image layer and the projection lens assembly.

19. The lamp device as claimed in claim 15, wherein the lamp device is a puddle lamp.

20. The lamp device as claimed in claim 15, wherein the gradient layer is a gray-level layer, a binary monochrome layer, or a multi-colored layer.

\* \* \* \* \*